United States Patent [19]

Mukumoto

[11] Patent Number: 5,794,652
[45] Date of Patent: Aug. 18, 1998

[54] RELIEF VALVE

[75] Inventor: Eiichi Mukumoto, Takarazuka, Japan

[73] Assignee: Konan Electric Co., Ltd., Hyogo, Japan

[21] Appl. No.: 563,566

[22] Filed: Nov. 30, 1995

[51] Int. Cl.$^6$ ............................................. F16K 31/124
[52] U.S. Cl. ........................ 137/474; 137/490; 137/508
[58] Field of Search ............................. 137/462, 472, 137/474, 490, 508, 512.3, 614.2

[56] References Cited

U.S. PATENT DOCUMENTS

| | | | |
|---|---|---|---|
| 3,583,431 | 6/1971 | Diel | 137/474 |
| 5,676,172 | 10/1997 | Mukumoto | 137/490 X |

FOREIGN PATENT DOCUMENTS 133875   5/1995   Japan .

*Primary Examiner*—Stephen M. Hepperle
*Attorney, Agent, or Firm*—Birch, Stewart, Kolasch & Birch

[57] ABSTRACT

The invention relates to a relief valve and intends to provide a relief valve which can reduce the difference between the dynamic set pressure and static set pressure of the relief pressure and its variation.

An internal circumferential surface of the pilot valve element 214 to which a support 227 is inserted is expanded to form a sub valve chest 231, a support and sub valve element 232 externally fitted to the sealing member 229 is arranged in this sub valve chest 231, the clearance between the inner circumferential surface of the sub valve element 232 and the support 227 is sealed with the sealing member 229, and at the same time the sub valve element 232 is pressed against the sub valve seat 238 formed in the inner circumferential surface of the pilot valve element 214 by oil pressure exerted on the sub valve element 232 from the pressure chamber 208 side to seal the clearance between the sub valve element 232 and the support 227. The sealing member 229 is not allowed to come in direct contact with the pilot valve element 214 to prevent the sealing member 229 deformed by oil pressure from applying resistance to the move of the pilot valve element 214.

1 Claim, 14 Drawing Sheets

1

RELIEF VALVE

BACKGROUND OF THE INVENTION

The invention relates to a relief valve, and more specifically, to a relief valve which can reduce the difference between the dynamic set pressure and static set pressure of the relief pressure and its variation.

The relief valve is designed to open when internal pressure of a hydraulic circuit exceeds a specified value, release pressurized oil of the hydraulic circuit to a relief oil passage, and recover internal pressure of the hydraulic circuit to a specified value, and is used, for example, for setting supply oil pressure of a hydraulic circuit or for an overload prevention safety device for presses.

The overload safety device for presses is designed, for example, in such a manner as shown in a press 306 of a crank mechanism of FIG. 7, in which hydraulic fluid is sucked into a hydraulic pump 303 via an oil feed passage 302 from an oil tank 301, the pressurized oil is fed to a hydraulic cylinder formed inside a slide 307 of the press 306 via a load circuit 305 connected to a discharge valve 304 of the hydraulic pump 303 and is filled in a hydraulic cylinder 308 to secure a cushion size volume, the press 306 operates the slide 307 vertically at a stroke of a specified size by the crank mechanism 350 and processes work 353 with dies 352 mounted to the slide 307 or a bolster 351, but if the press improperly lowers due to defective adjustment of the stroke range height of the slide 307 or work 353 with excessively large thickness is charged, the slide 307 or dies 352 bite into the work 353 and enters the overload state, but boosted oil of the hydraulic cylinder 308 is released to the oil tank 301 via a relief oil passage 310 from the relief valve 309 connected to the load circuit 305 and retracts the hydraulic cylinder 308 only by the cushion size volume so that the slide 307 can pass the bottom dead center, thereby preventing overload and protecting the dies 352 and the press 306.

For the hydraulic pump 303, an air-driven type which automatically stops when internal pressure of the load circuit 305 and the hydraulic cylinder 308 exceeds a specified value and automatically restarts when it lowers below a specified value is used, and the hydraulic pump 303 and the discharge valve 304 are assembled integral with the relief valve 309. For the relief valve 309, the one which is designed to release a large flow rate for absorbing the overload and to release a small flow rate for temperature compensation for increase of pressurized oil temperature is used.

In a conventional example shown in FIG. 8, on one side of the valve case 311 of the relief valve 309, a suction port 312 to which the oil passage 302 is connected, a load port 313 to which the load circuit 305 is connected, and a return port 314 to which the relief oil passage 310 is connected are opened. In this valve case 311, a pressure chamber 315 in free communication with the discharge valve 304 and the load port 313 and a valve chest 316 concentrically following the other end of this pressure chamber 315 and in free communication with the return port 314, and a pressure setting chamber 317 concentrically in free communication with the valve chest 316 are formed.

To the said valve chest 316, a main valve element 318 is slidably inserted in the concentric direction in common with the valve chest 316, and a guide sleeve 319 formed in a stepped cylinder shape following this main valve element 318 is slidably internally fitted to the pressure setting chamber 317.

To an oil passing hole 320 formed at the center of the main valve element 318, a pilot valve element 321 is slidably

2 inserted in the sliding direction of the main valve element 318 and to the inside of the guide sleeve 319 in the pressure setting chamber 317, a support spring 322 for energizing the pilot valve element 321 to the pressure chamber 208 side and a pressure setting spring are arranged.

As shown in FIG. 9 to FIG. 12, the said oil passing hole 320 comprises holes with different diameters in which a small-diameter section 324, a taper section 325 where the diameter gradually increases, and a large diameter section 326 concentrically continue in order of the flow from the pressure chamber side, and at the connections between the small-diameter section 324 and the taper section 325 of this oil passing hole 320, a pilot valve seat 327 is formed. At the large-diameter section 326 of this oil passing hole 320, a main valve hole 328 is formed, which is in free communication with the portion of the valve chest 316 on the external circumference of the main valve element 318.

Throughout the pilot valve seat 327 or the large-diameter section 326 of this oil passing hole 320, the pilot valve element 321 is inserted free to advance or retreat in the axial direction of the oil passing hole 320, and at the edge of this pilot valve element 321 on the pressure chamber 315 side, a pilot valve face 329 comprising a taper face opposing the said taper section 325 and the pilot valve seat 327 is formed. The circumferential surface 330 of the pilot valve element 321 is designed to come slidably in contact with the large-diameter section 326 throughout the full length of the circumference, and when the isolating distance of this pilot valve face 329 to the pilot valve seat 327 exceeds a specified value, the said main valve hole 328 is designed to open, and when the isolating distance of this pilot valve face 329 to the pilot valve seat 327 is short of a specified value, the said main valve hole 328 is designed to close.

As shown in FIG. 13, at the center of the said pilot valve element 321, a support insertion hole 331 comprising a stepped hole in which the diameter increases on the pressure chamber 315 side and the diameter decreases on the pressure setting chamber 317 side is formed, and the tip end of the shaft-form support 333 protruding from the spring support seat 332 (shown in FIG. 8 to FIG. 12) arranged in the pressure setting chamber 317 is inserted through this support insertion hole 331 free to advance and retreat.

At the tip end of this support 333, a head 334 whose diameter is extended in the nearly same shape as that of the large-diameter section of the support insertion hole 331 is formed, and by receiving this stepped surface 336 of the support inserting hole 331 with the stepped surface 335 on the pressure setting chamber 317 side of this head 334, the pilot valve element 321 is prevented from rushing into the pressure chamber 315 side by a specified size.

On the circumferential surface of the said support 333, a sealing member 337 comprising O-rings which oiltightly seal the minute clearance formed between the support 333 and the support inserting hole 331 is supported.

As shown in FIG. 8, to the spring receiving seat 332 for receiving the said support spring 322 and the pressure setting spring 323, an adjusting screw 339 inserted free to drive forward and backward to the end wall 338 of the valve case 311 is rotatably connected, and rotating this adjusting screw 339 can advance or retreat the spring receiving seat 332 at the pressure setting chamber 317 to adjust relief pressure, and thereafter, the adjusting screw 339 is fixed to the valve case 311 with a fixing screw 340.

As shown in FIG. 9 to FIG. 12, between the taper section 325 of the main valve element 318 and the pilot valve surface 329 of the pilot valve element 321, a pilot chamber 341 is formed, and to the main valve element 318, an orifice 342 is formed to enable this pilot chamber 341 to freely communicate to the portion of the valve chest 316 on the external circumferential surface of the main valve element 318.

When the press 306 is at standstill, internal pressure of the pressure chamber 315 is brought to atmosphere (pressure: 0), and as shown in FIG. 9, the main valve element 318 is located at the position where it has moved farthest to the pressure chamber 325 side, and the pilot valve element 321 is located at the position where it is received to the pilot valve seat 327 of the main valve element 318 by the pressure setting spring 323.

When the press 306 is used, even if the press 306 is not applied with any load, internal pressure of the pressure chamber 315 is kept to a specified preload pressure (Ex. 0.9 MPa) by feeding pressurized oil from the hydraulic pump 303, and as shown in FIG. 10, the main valve element 318 and the pilot valve element 321 are moved to the pressure setting chamber 317 side by internal pressure of this pressure chamber, the guide sleeve 319 and the support 333 is received by the valve case 311, restricting the move to the pressure setting chamber 317 side, and the pilot valve element 321 opposes internal pressure exerted from this pressure chamber 315 with the energizing force of the pressure setting spring 323 and support spring 322 exerted from the opposite direction, and presses the pilot valve surface 329 against the pilot valve seat 327.

If internal pressure of the pressure setting chamber 315 further increases the relief pressure, as shown in FIG. 11, the pilot valve element 321 is forced in on the pressure setting chamber 317 side while resisting to the pressure setting spring 323 and the support spring 322, causing the pilot valve surface 329 to separate from the pilot valve seat 327 and allowing pressurized oil to flow into the taper-ring-form pilot chamber 341 between the taper section 325 and the pilot valve surface 329.

For example, when internal pressure of the pressure chamber 315 slowly increases as in the case when pressure is increased by the increase of oil temperature, the volume of pressurized oil flowing into the pilot chamber 341 is small and therefore, by allowing pressurized oil of this pilot chamber 341 to flow into the valve chest on the external circumference of the main valve 318 via the orifice 342 formed on the main valve element 318, internal pressure of the pressure chamber 315 is depressurized to lower than the specified value before the main valve hole 328 opens, and the pilot valve element 321 is pushed by the support spring 322 as well as the pressure setting spring 323, bringing the pilot valve surface 329 in close contact with the pilot valve seat 327 and closing the oil passing hole 320.

As against this, in the case when internal pressure of the pressure chamber 315 rapidly increases as in the case when overload occurs, since a large volume of pressurized oil rapidly flows into the pilot chamber 341, depressurization effects by flowing out of pressurized oil from the orifice 342 reaches a negligible level, and as shown in FIG. 12, internal pressure of the pressure chamber 315 is received by the overall pilot valve surface 329 and the pilot valve element 321 is rapidly pushed into the pressure setting chamber 317 side and at the same time internal pressure of the pressure chamber 315 is also received by the taper section 325 of the main valve element 318 and the main valve element 318 rapidly moves to the pressure chamber 315 side.

And after the pilot valve element 321 separates from the pilot valve seat 327, the pilot valve element 321 and the main valve element 318 rapidly move in the opposite side each other, instantaneously opening the main valve hole 328 and allowing a large volume of pressurized oil to the portion of the valve chest 316 outside the main valve element 318 and return to the oil tank 301 via the return port 314 and the relief oil passage 310, and with this operation, the hydraulic cylinder 308 is retracted and the overload condition is canceled.

Now, when the pressurizing capacity of main functional elements of the press 306 is set, the press 306 is stopped, and after a high-pressure hydraulic cylinder is placed on a bolster as a load, overload is forcibly generated by raising and lowering the slide at a low speed, and the relief pressure of the overload safety device is adjusted to set the capacity. This process is called static setting, and the relief pressure set by static setting is called static set pressure.

In practical use, sometimes, the slide of the press 306 is raised and lowered at a frequency of 35 to 70 times per minute, struck against the work 353 on the bolster, and with pressurizing fore exerted to the hydraulic cylinder 308, the relief pressure at which overload occurs is adjusted and set. This process is called dynamic setting, and the capacity when overload occurs in the dynamic setting is called actual capacity and oil pressure in this event is called dynamic set pressure.

In actuality, the dynamic set pressure is about 20% higher than the static set pressure at maximum, which greatly varies and is not stabilized. The difference between this static set pressure and dynamic set pressure and variation of the dynamic set pressure become conspicuous as the set pressure increases.

The large difference between dynamic set pressure and static set pressure of this relief valve and the great variation are not desirable from the viewpoint of protection of dies, and it is desirable to keep them as small as possible.

Research results indicate that these difference and variation between the dynamic and static set pressures are caused by the fact in that high-pressure pressurized oil from the pressure chamber 315 side is suddenly exerted on the sealing member 337 for sealing a minute clearance between the support 333 and the support inserting hole 331 and deforms the sealing member 337 which is pressed against the inner surface of the support inserting hole 331, preventing the valve opening operation of the pilot valve element 321.

In view of the foregoing, this invention has been made, and it is a main object of this invention to provide a relief valve which can reduce the difference between the dynamic set pressure and the static set pressure of the relief valve and their variations.

This invention has taken the following measures to achieve the above object in a relief valve in which a valve element is externally fitted to the shaft-form support fixed to the valve case in such a manner free to advance and retreat in the axial direction and a sealing means comprising an elastic body is provided for sealing the clearance between the support and the valve element.

That is, a sub valve chest is formed by expanding the internal circumferential surface of the valve element, and inside this sub valve chest, a sub valve element externally fitted to the support and the sealing member is arranged, and the clearance between the internal circumferential surface of the sub valve element and the support is sealed with the sealing member and at the same time the sub valve element is pressed against the diameter changing portion on the internal circumferential surface of the valve element by oil pressure or support spring force exerted on the sub valve element from the pressure bearing surface side, and the clearance between the sub valve element and the support inserting hole is sealed.

When the sealing member is deformed by oil pressure and is pressed against the internal circumferential surface of the sub valve element, resistance against the move of the sub valve element with respect to the support increases and the move of the sub valve element is prevented, but since pressurized oil enters the minute clearance between the sub valve element and the pilot valve element and exhibits lubricating action, the pilot valve element is able to move with respect to the sub valve element and the support extremely easily.

DESCRIPTION ON PREFERRED EMBODIMENTS

A relief valve related to one embodiment of this invention will be specifically described as follows based on accompanying drawings.

Figure 3:
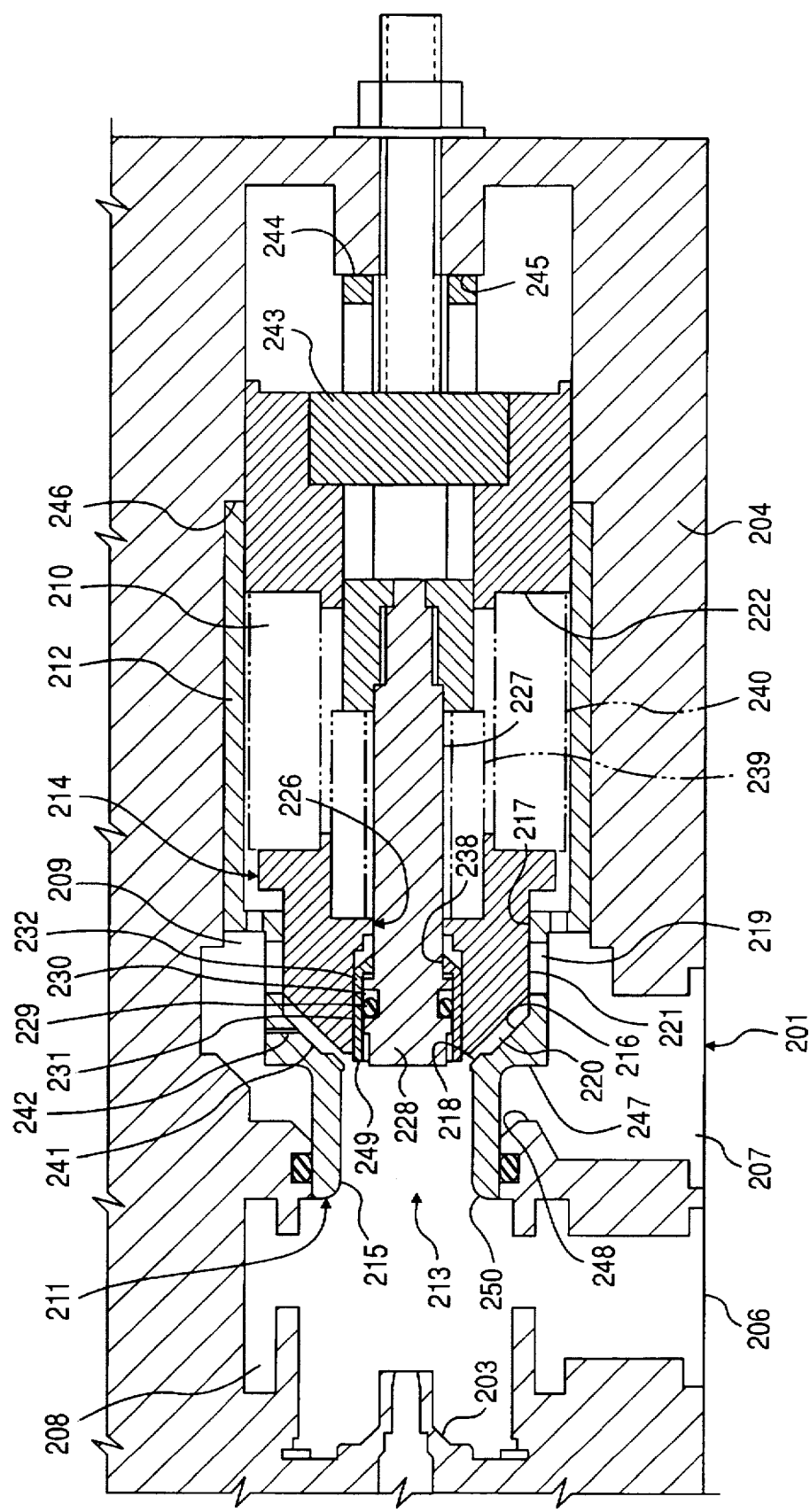
FIG. 3 is a cross section of an essential part of one embodiment of this invention when a small flow rate is released.
Figure 4:
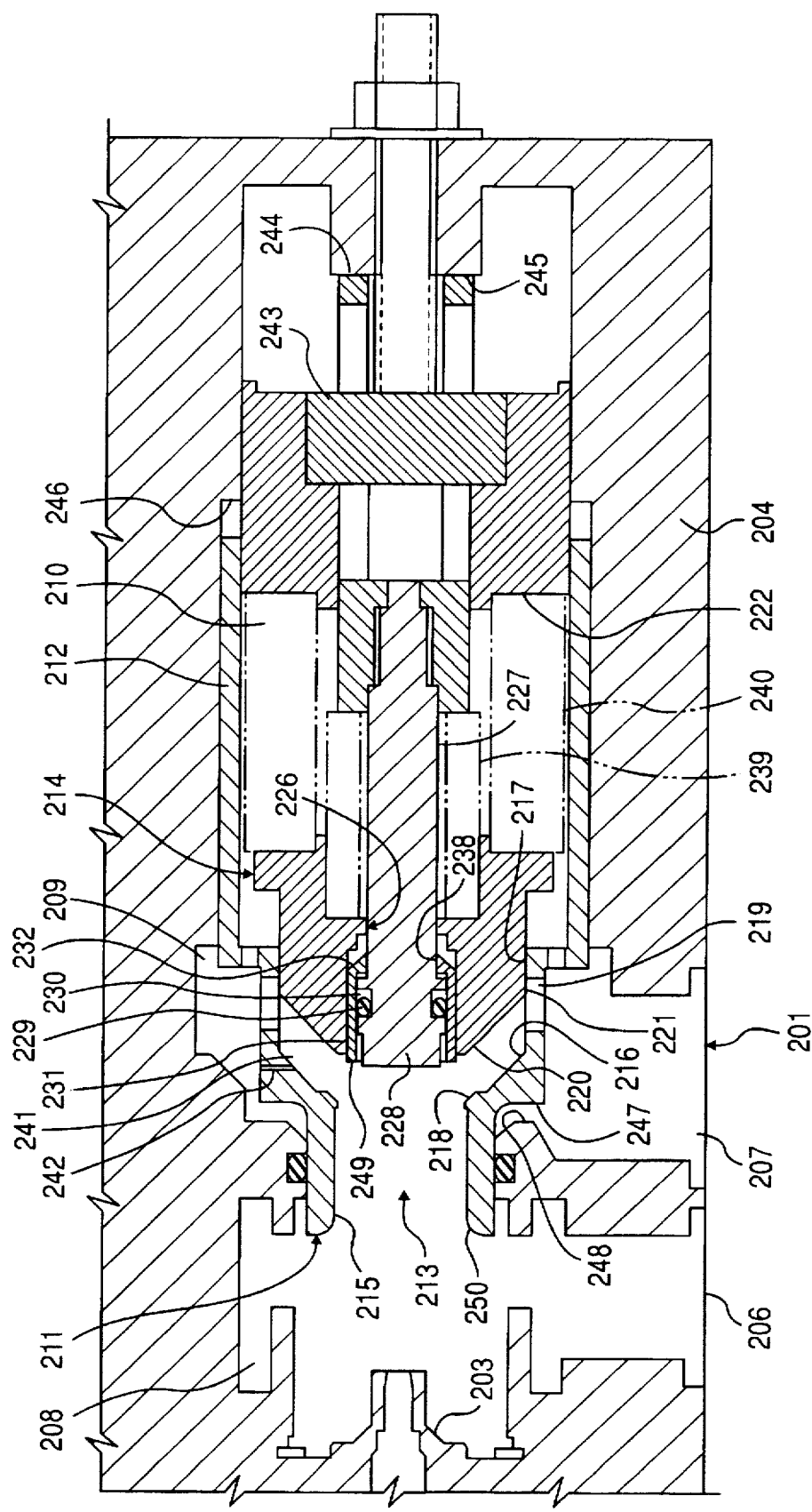
FIG. 4 is a cross section of an essential part of one embodiment of this invention when a large flow rate is released.
Figure 5:
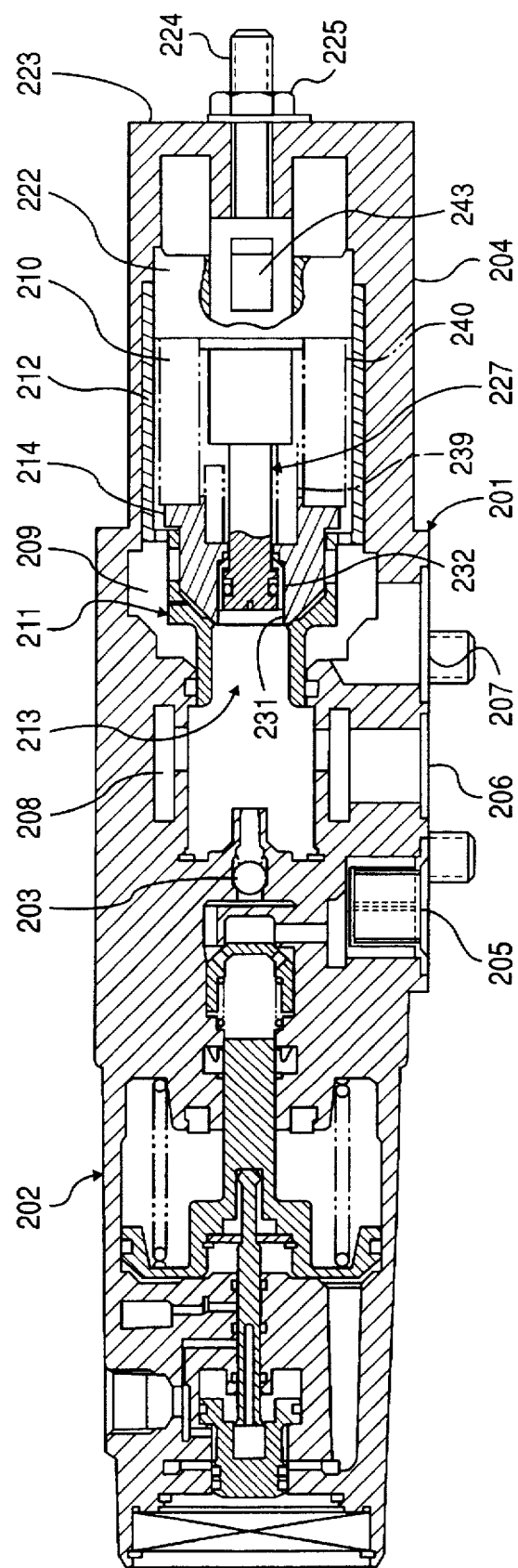
FIG. 5 is a cross section of one embodiment of this invention.

The relief valve related to one embodiment of this invention shown in FIG. 1 to FIG. 6 is used for an overload prevention device for presses, and this relief valve 201 is assembled integral with a check valve 203 for preventing backflow from a hydraulic pump and load circuit to a hydraulic pump 202 as shown in FIG. 5.

On one side of the valve case 204 of the relief valve 201, an inlet port 205 for introducing the hydraulic fluid to the hydraulic pump 202, a load port 206 connected to the load circuit, and a return port 207 connected to the relief circuit are opened, and inside the valve case 204, a pressure chamber 208 in free communication with the said check valve 203 and the load port 206, a valve chest 209 concentrically following this pressure chamber 208 and in free communication with the said return port 207, and in addition, a pressure setting chamber 210 concentrically following the valve chest 209 are formed.

To the valve chest 209, a main valve element 211 is slidably inserted in the axial direction in common with the valve chest 209, and following this main valve element 211, a guide sleeve 212 formed in a stepped cylinder form is slidably internally fitted to the pressure setting chamber 210.

At the core of the said main valve 211, a oil passing hole 213 is formed, and in this oil passing hole 213, a pilot valve element 214 is inserted free to advance and retreat in the axial direction of the main valve element.

As shown in FIG. 1 to FIG. 4, the said oil passing hole 213 is formed in holes of different diameters comprising a small-diameter section 125, a taper section 216 whose diameter gradually increases, and a large-diameter section 217 continuously in a concentric form from the pressure chamber 208 side in that order, and at the connections between the small-diameter section 215 and the taper section 216 of this oil passing hole 213, a pilot valve seat 218 is formed, and at the large-diameter section 217 of this oil passing hole 213, a main valve hole 219 is formed to enable the oil passing hole 213 in free communication with the portion of the valve chest 209 on the circumference of the main valve element 211.

Throughout the pilot valve seat 218 to the large-diameter section 217 of this oil passing hole 213, the pilot valve element 214 is internally fitted free to advance and retreat in the axial direction of the oil passing hole 213, and at the edge of the pilot valve element 214 on the pressure chamber 208 side, a pilot valve surface 220 comprising a taper surface opposing to the said taper section 216 and the pilot valve seat 218 is formed.

The circumferential surface 221 of the pilot valve element 214 is brought slidably and internally in contact with the said large-diameter section 217 throughout the whole circumference, and when the isolating distance from the pilot valve seat 218 of the said pilot valve surface 220 exceeds a specified value, the said main valve hole 219 opens and when the isolating distance from the pilot valve seat 218 of the pilot valve surface 220 is short for a specified value, the said main valve hole 219 is closed.

As shown in FIG. 5, the guide sleeve 212 internally fitted to the said pressure setting chamber 210 has a hollow section continuously following the oil passing hole 213 of the main valve element 211, and to this hollow section, a spring support seat 222 is arranged free to advance and retreat in the axial direction of the pressure setting chamber 210, and to this spring support seat 222, a connecting rod 243 is internally fitted, and an adjusting screw 224 inserted free to be driven forward and backward to the end wall 223 of the valve case 204 is rotatably connected, and rotating this adjusting screw 224, the spring support seat 222 advances and retreats in the pressure setting chamber 210 via the said connecting rod 243, and by fixing this adjusting screw 224 to the valve case 204 with a fixing screw 225, the position of the spring support seat 222 is fixed.

To the pilot valve element 214, a center hole 226 is drilled through along the shaft center, and the tip end of the shaft-form support 227 protruding from the said spring support seat 222 is rushed into this center hole 226.

Figure 6:
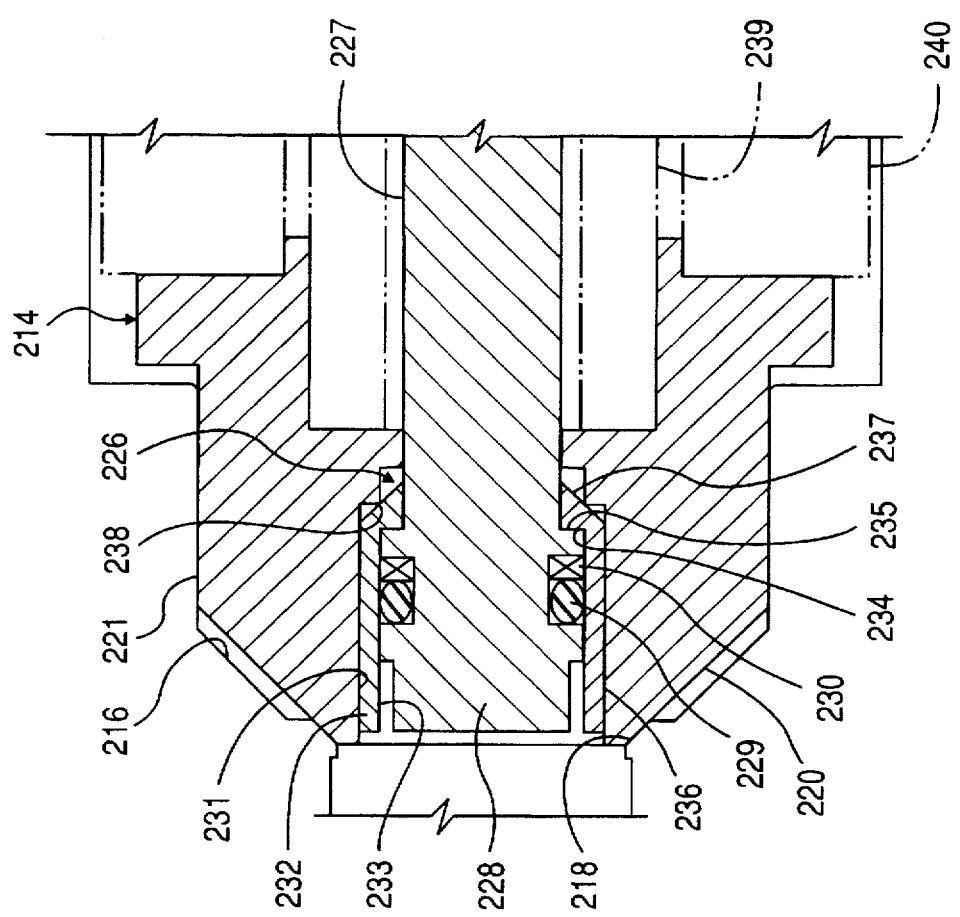
FIG. 6 is an enlarged cross-sectional view of an essential part of one embodiment of this invention.
Figure 7:
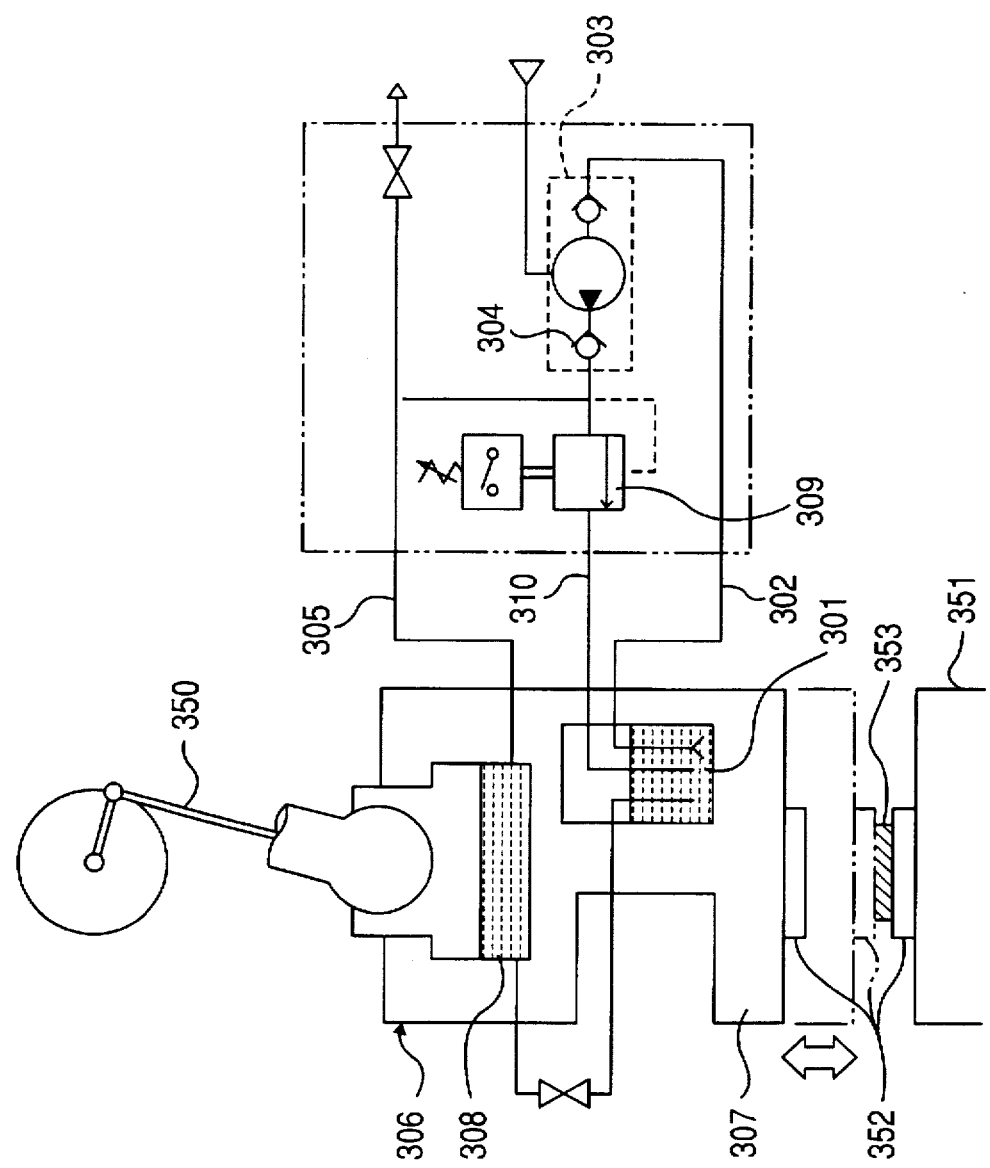
FIG. 7 is a hydraulic circuit diagram of an overload safety device of a press.
Figure 8:
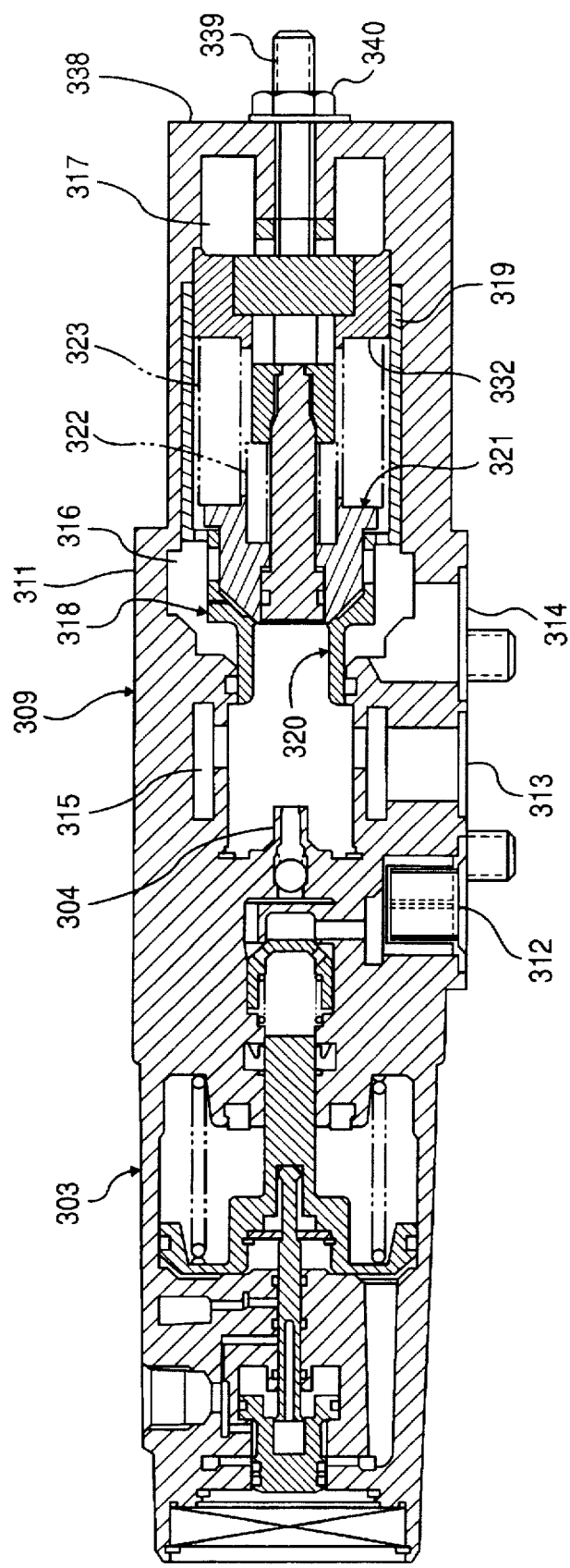
FIG. 8 is a cross section of a conventional example.
Figure 9:
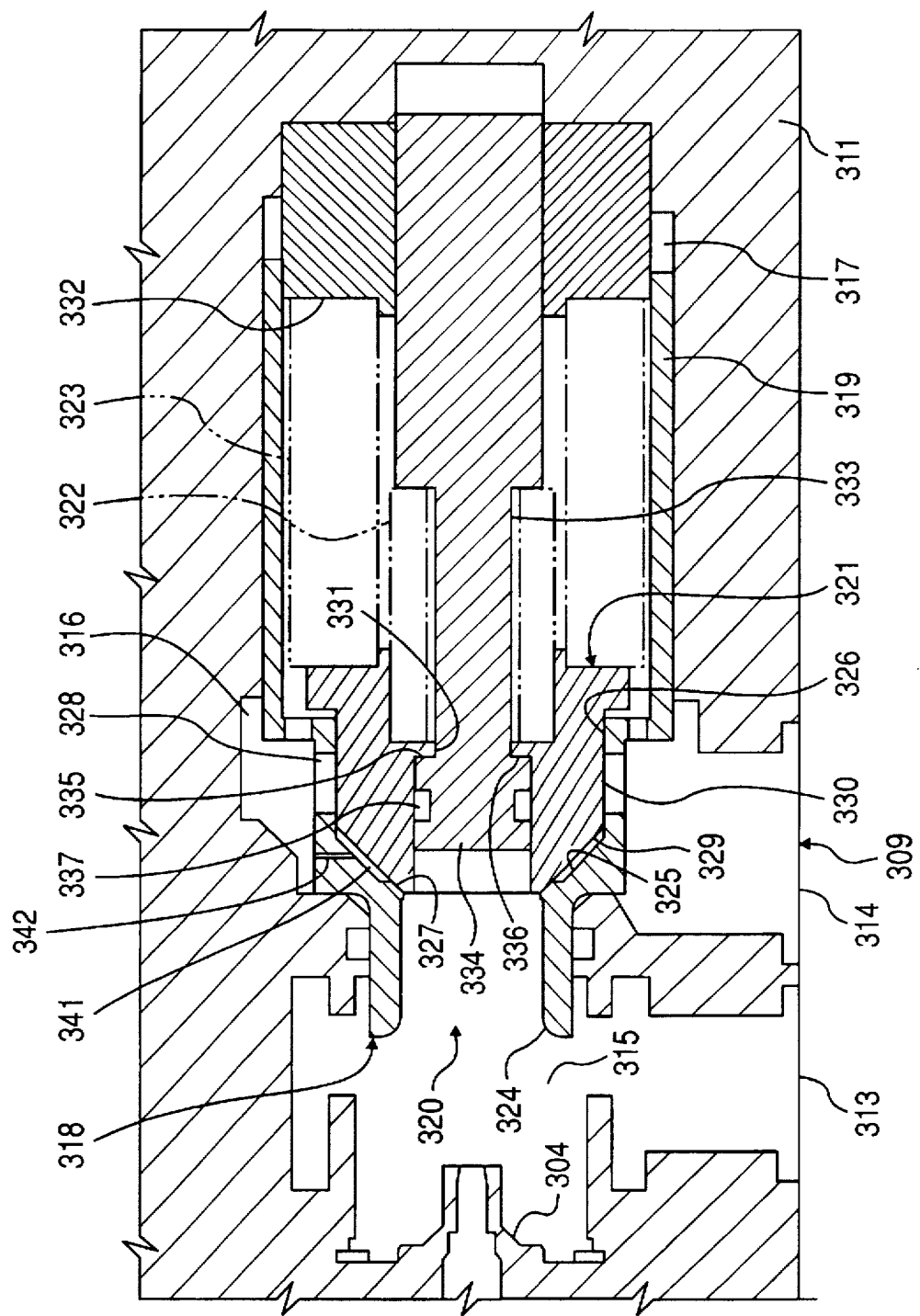
FIG. 9 is a cross section of an essential part of a conventional example at no load.
Figure 10:
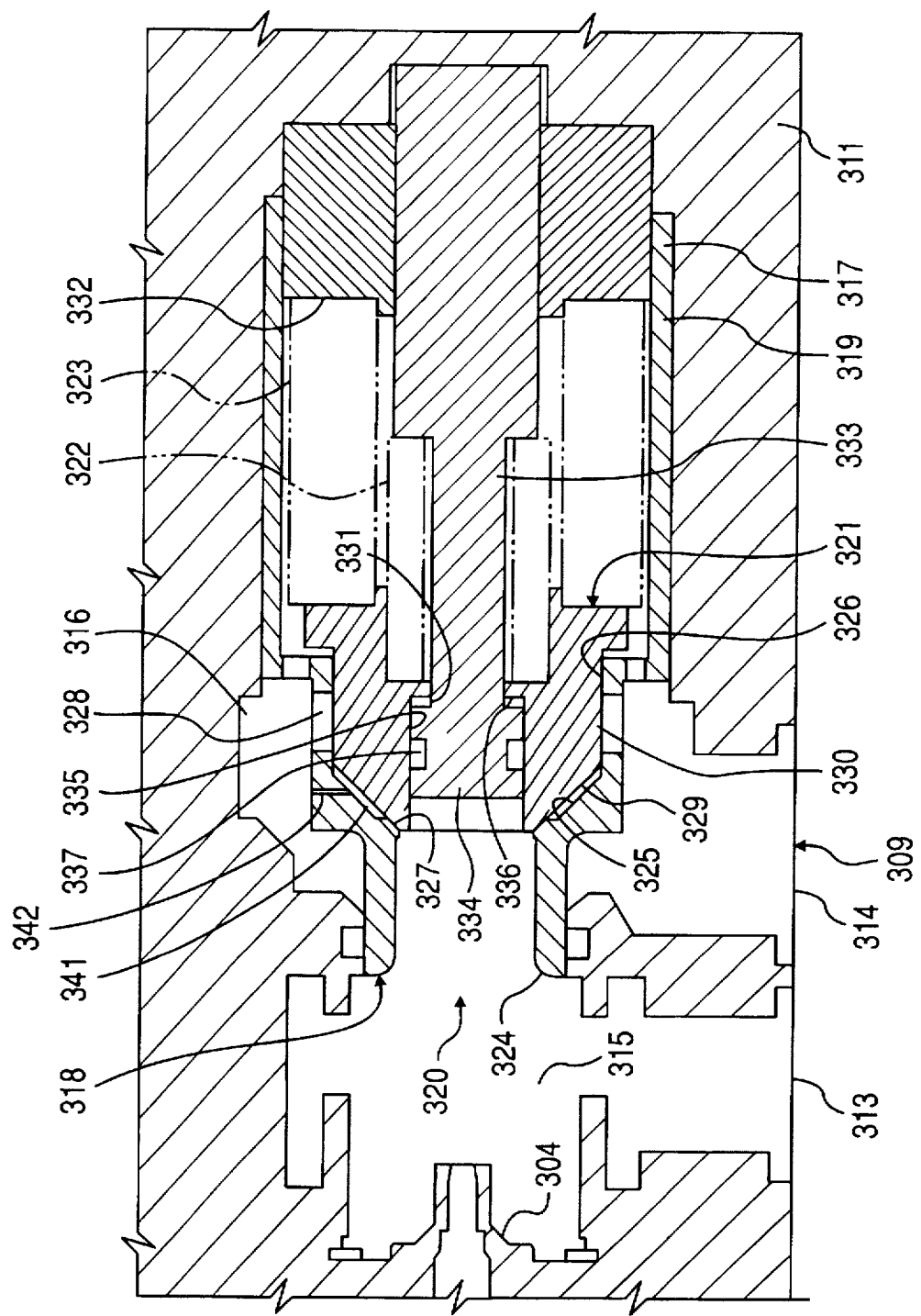
FIG. 10 is a cross section of an essential part of a conventional example in the preload condition.
Figure 11:
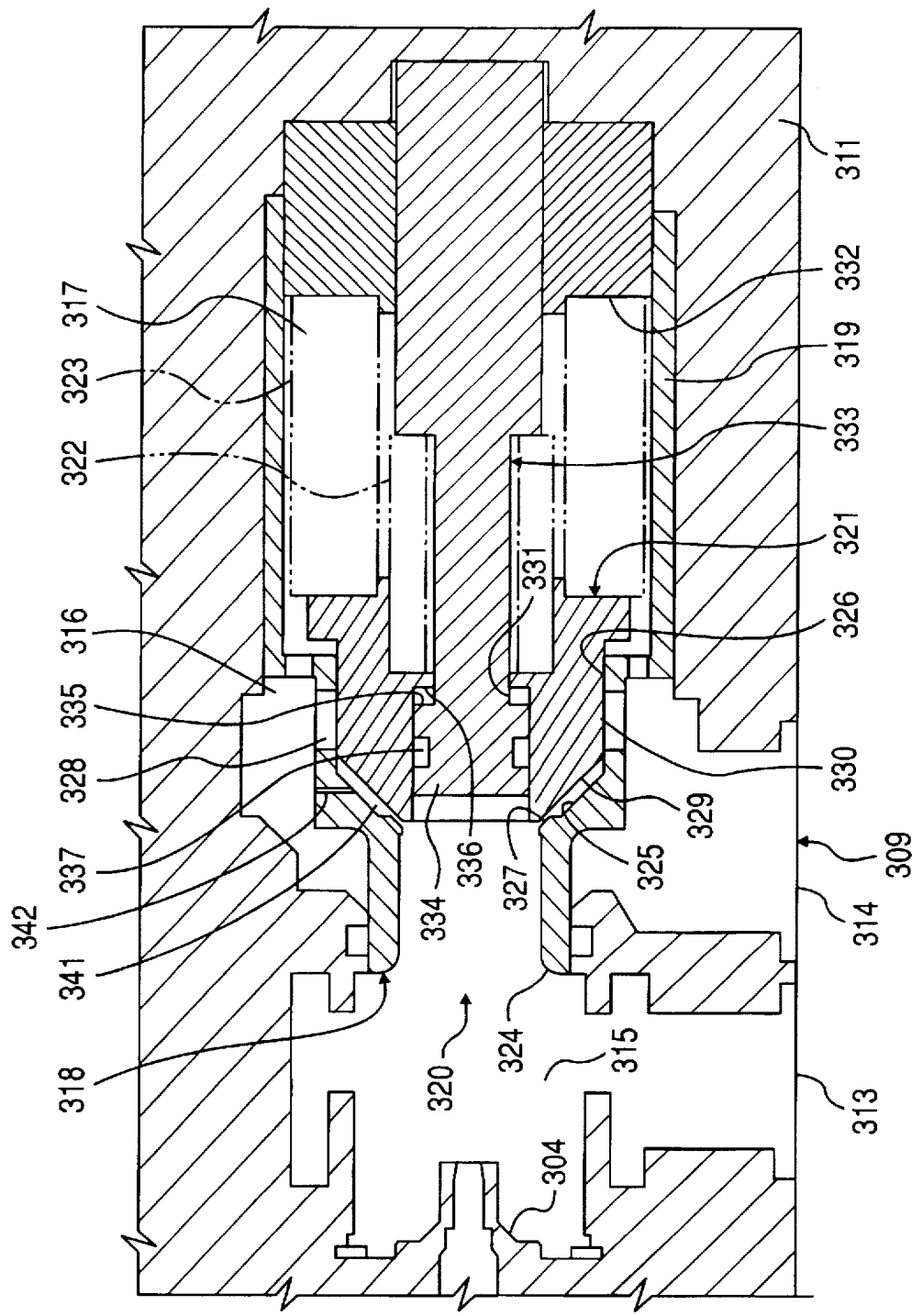
FIG. 11 is a cross section of an essential part of a conventional example when a small flow rate is released.
Figure 12:
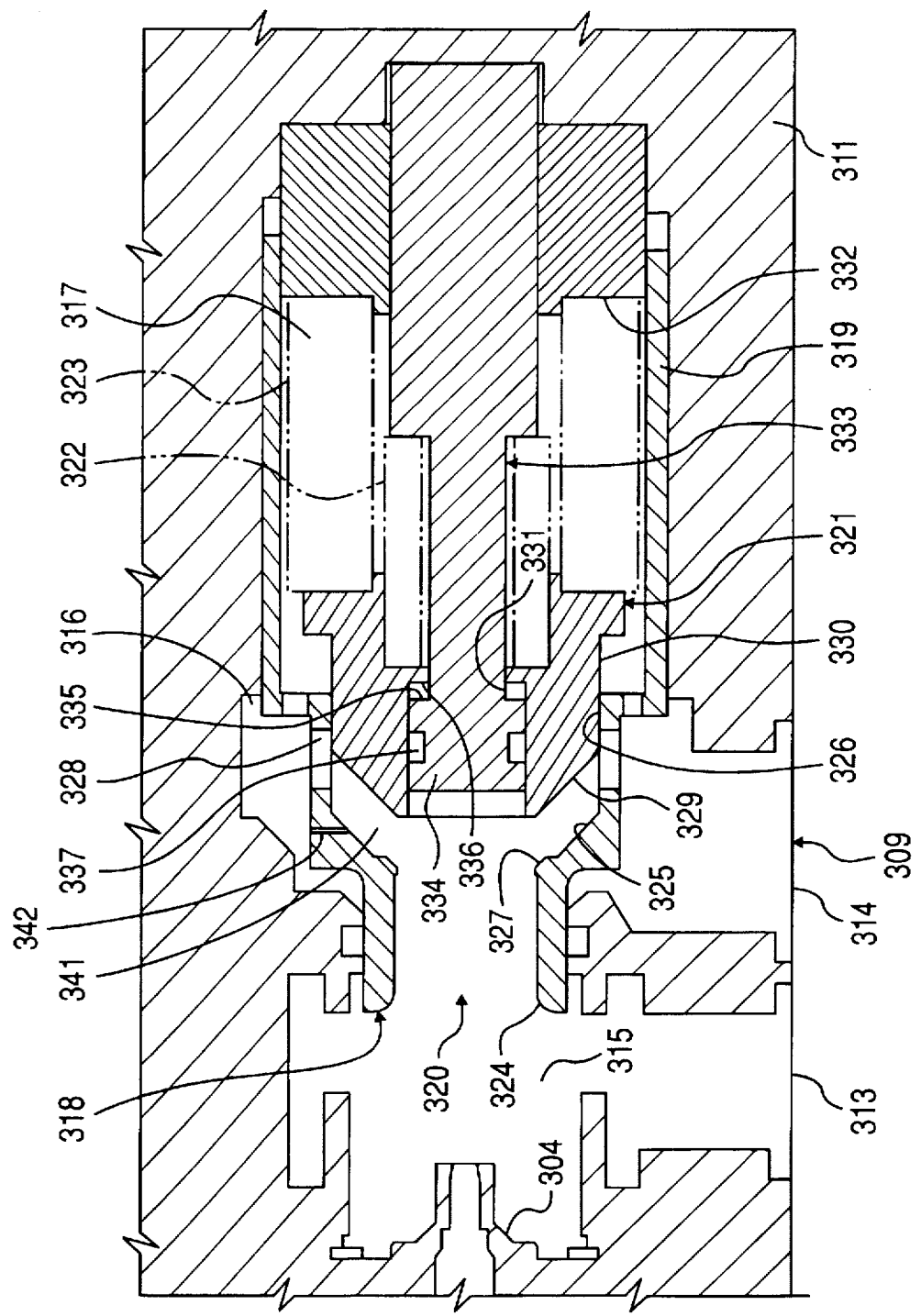
FIG. 12 is a cross section of an essential part of a conventional example when a large flow rate is released.
Figure 13:
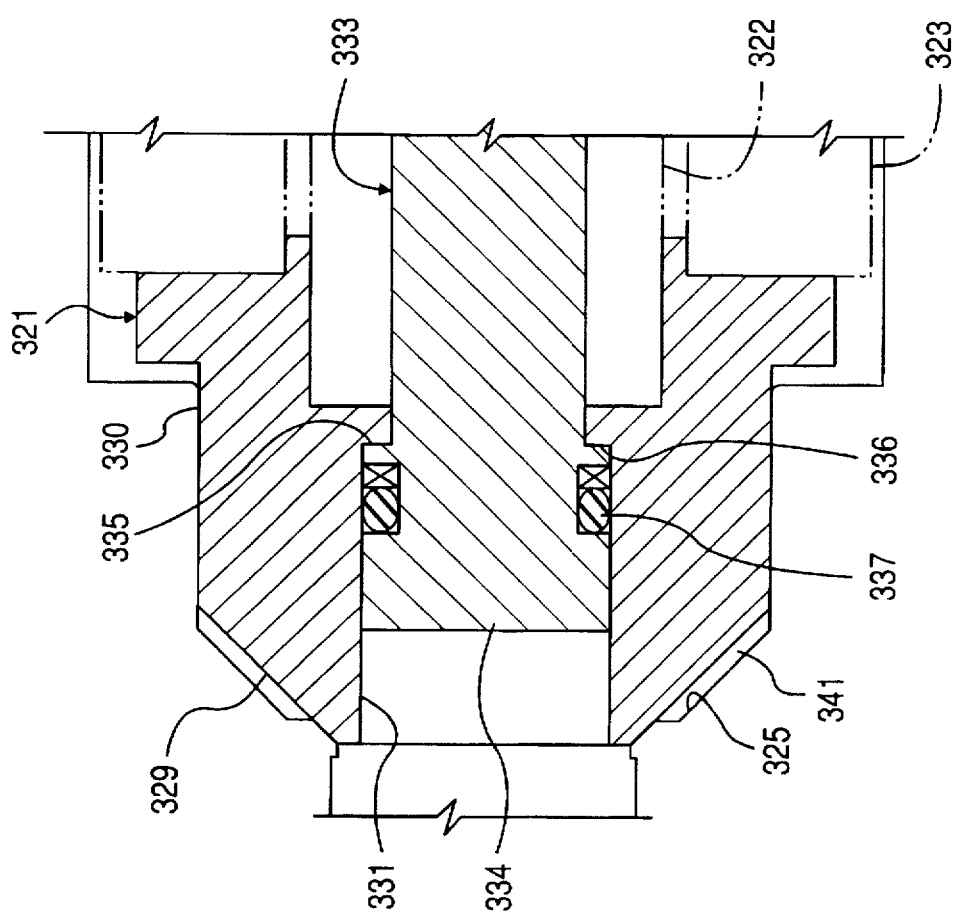
FIG. 13 is an enlarged cross-sectional view of an essential part of a conventional example.
Figure 14:
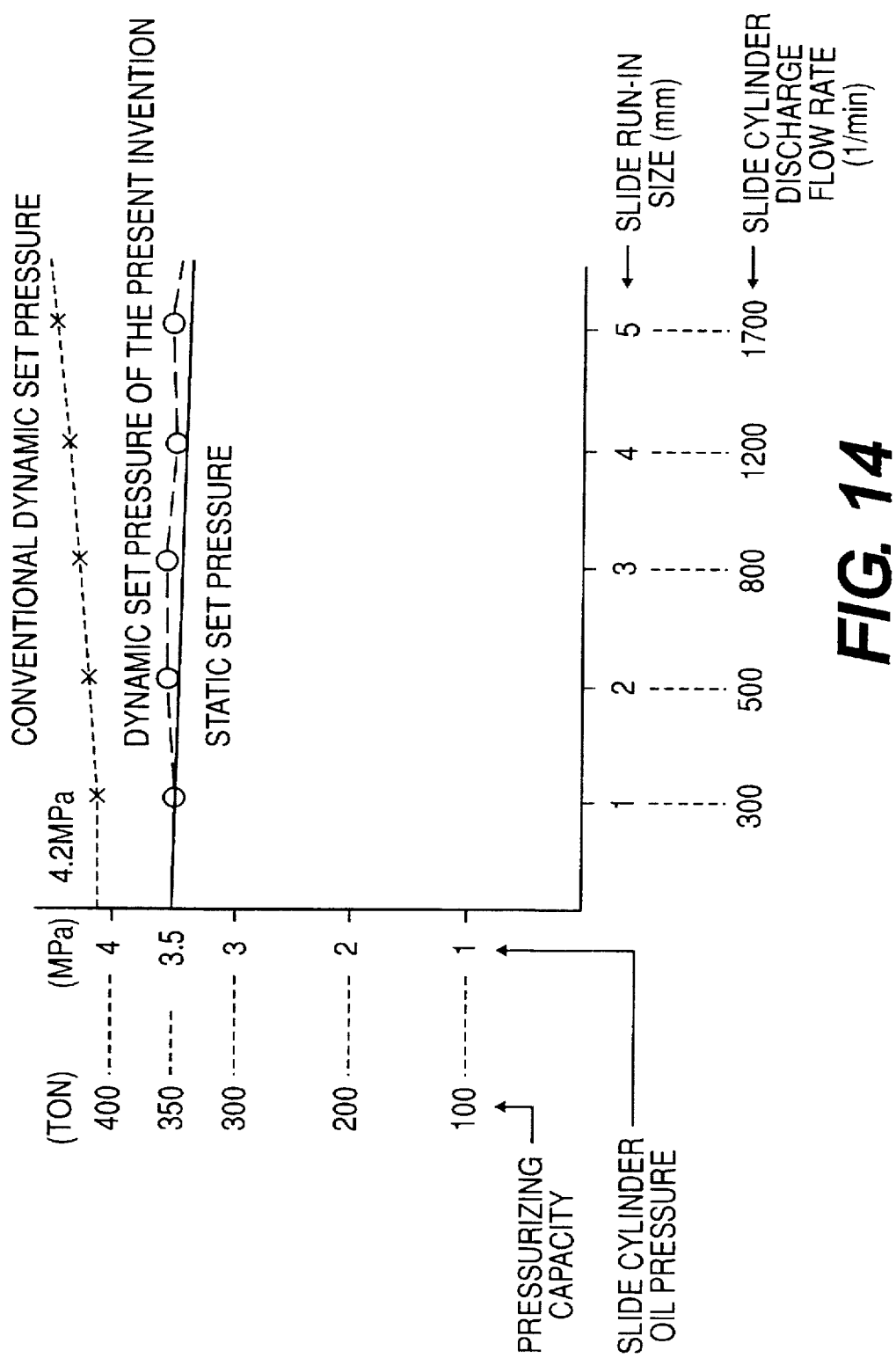
FIG. 14 is a graph showing the relief capacity of this invention.

As shown in FIG. 6, to the tip end of this support 227, a head 228 expanded in a stepped form is formed, and to this head 228, a sealing member 229 comprising O-rings and a backup ring 230 are externally fitted and supported.

By expanding the pressure chamber 208 side of the center hole 226 of the pilot valve element 214 in a stepped form, a sub valve chest 231 is formed, and to this sub valve chest 231, a sub valve element 232 externally fitted to the tip end of the support 227, sealing member 229, and backup ring 230 free to advance and retreat is inserted.

The center hole 233 of this sub valve element 232 is formed with holes with different diameters, and by receiving the stepped surface 234 with the end surface 235 of the head 228 on the pressure setting chamber 210 side, the sub valve element 232 is prevented from escaping from the support 227 to the pressure chamber 208 side, and by allowing the sealing member 229 to closely adhere to the inner circumferential surface of this center hole 233, the clearance between the sub valve element 232 and the support 227 can be sealed.

This sub valve element 232 comprises a cylindrical surface 236 slidably and internally in contact with the sub valve chest 231 and a sub valve surface 237 in a cone shape following the pressure setting chamber 210 side, and by bringing the sub valve seat 238 formed in the sub valve chest 231 into contact and isolating it from the pressure chamber 208, the clearance between the sub valve element 227 and the pilot valve element 214 is opened and closed by a poppet system.

Figure 1:
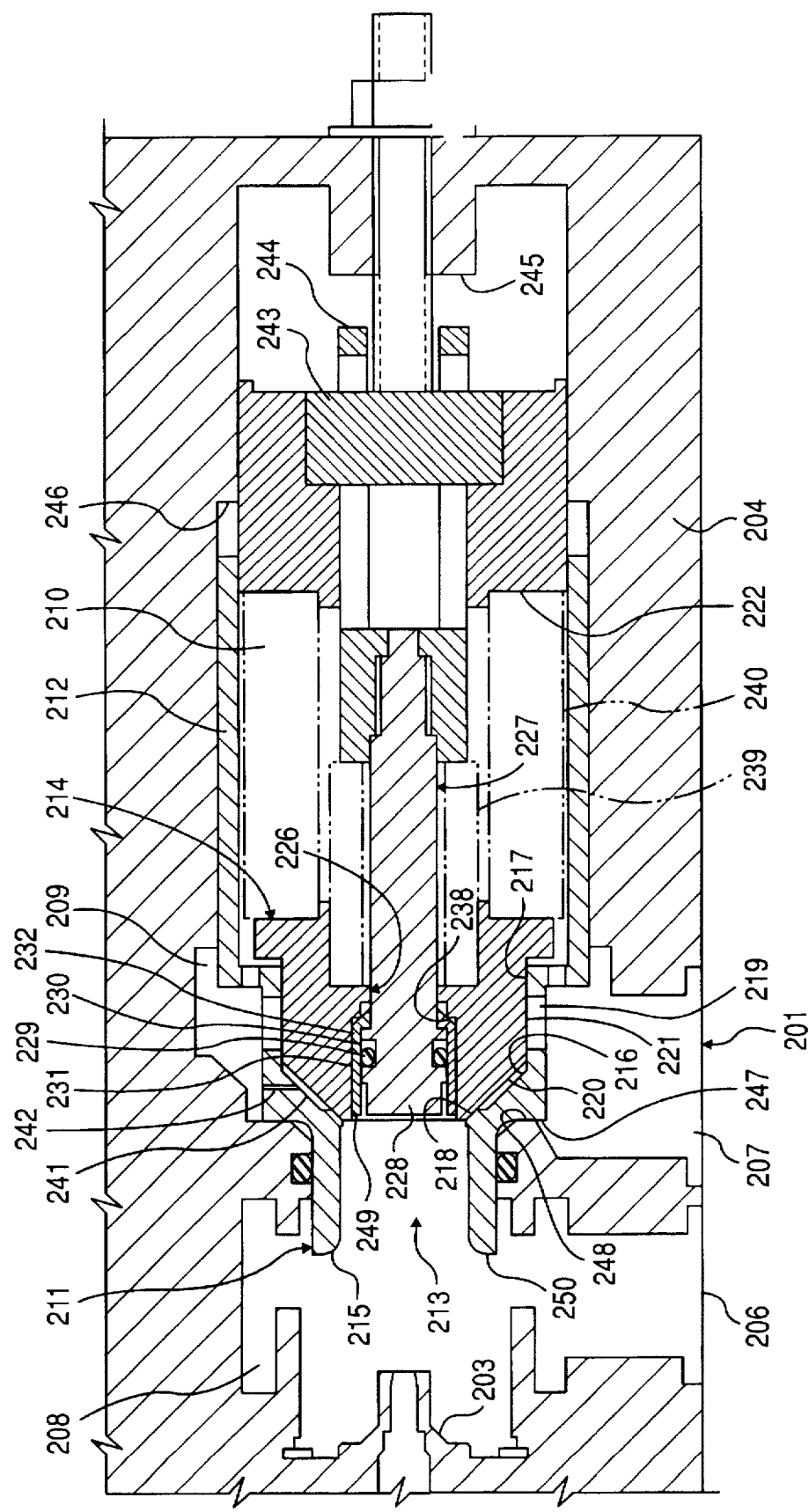
FIG. 1 is a cross section of an essential part of one embodiment of this invention at no load.

As shown in FIG. 1, internal pressure of the pressure chamber 208 moves to the pressure chamber 208 side when it is below the specified pressure, and between the support 227 and the pilot valve element 214 when the support end face 244 comes in contact and is isolated from the end face 245 at the depth of the valve case, the end face 235 of the head 228 of the support 227 presses and closes the sub valve surface 237 of the sub valve element 232 against the sub valve seat 238 of the pilot valve element 214 via the stepped surface 234 off the sub valve element 232, and at the same time, as shown in FIG. 2 to FIG. 5, internal pressure of the pressure chamber 208 moves to the pressure setting chamber 210 side when it exceeds the specified pressure, and between the support 227 and the pilot valve element 214 when the support end face 244 comes in contact with the end face 245 at the depth of the valve case, a support spring 239 is arranged for generating force to either press or energize the pilot valve face 220 of the pilot valve element 214 against the pilot valve seat 218 of the main valve seat.

In addition, as shown in FIG. 1 to FIG. 5, between the spring support seat 222 and the pilot valve element 214, there arranged is a pressure setting spring 240 for generating force to press the pilot valve face 220 of the pilot valve element 214 against the pilot valve seat 218 of the main valve element and energizing it on the pilot valve seat 218 side.

The main valve element 211 and the pilot valve element 214 move to the pressure chamber 208 side with the relevant pressure setting spring 240 when internal pressure of the pressure chamber 208 is lower than the specified pressure, and the main valve element center end face 247 returns to the valve case, comes in contact to the side end face 248, restricting the move to the pressure chamber 208 side, and when internal pressure of the pressure chamber 208 exceeds the specified pressure, they move to the pressure setting chamber 210 side by internal pressure of the pressure chamber 208 opposite to the relevant pressure setting spring 240, and the main valve element 211 has the guide sleeve 212 brought in contact with the valve case center end face 246, and the pilot valve element has the support end face 244 brought in contact with the valve case depth end face 245, restricting the move to the pressure setting chamber 210 side.

When internal pressure of the pressure chamber 208 is below the specified pressure and the main valve element 211 and the pilot valve element 214 have moved to the pressure chamber 208 side, the sub valve surface 237 of the sub valve element 232 presses and closes the sub valve seat 238 of the pilot valve element 214 with spring force of the support spring 239, and when internal pressure of the pressure chamber 208 exceeds the specified pressure, they move to the pressure setting chamber 210 side and the support end face 244 comes in contact with the valve case depth end face 245, and when the move to the pressure setting chamber 210 side is restricted, the pressure chamber 208 side end face 249 of the sub valve element 232 bears internal pressure of the pressure chamber 208 exceeding the specified pressure and generates thrust to the pressure setting chamber 210 side, and the sub valve face 237 of the sub valve element presses and closes the sub valve seat 238 of the pilot valve element 214.

As shown in FIG. 1 to FIG. 4, a pilot chamber 241 is formed between the taper section 216 of the main valve element 211 and the pilot valve surface 220 of the pilot valve element 214, and an orifice 242 which communicates this pilot chamber 241 with the portion of the valve chest 209 on the outer circumference of the main valve element 211 is formed on the main valve element 211.

When the press is at standstill, internal pressure of the pressure chamber 208 is held to atmosphere (pressure: 0), and as shown in FIG. 1, the main valve element 211 is located at the position where it has moved farthest to the pressure chamber 208 side, and the pilot valve element 214 is energized to be located at the position where it is received to the pilot valve seat 218 by the pressure setting spring 240.

Figure 2:
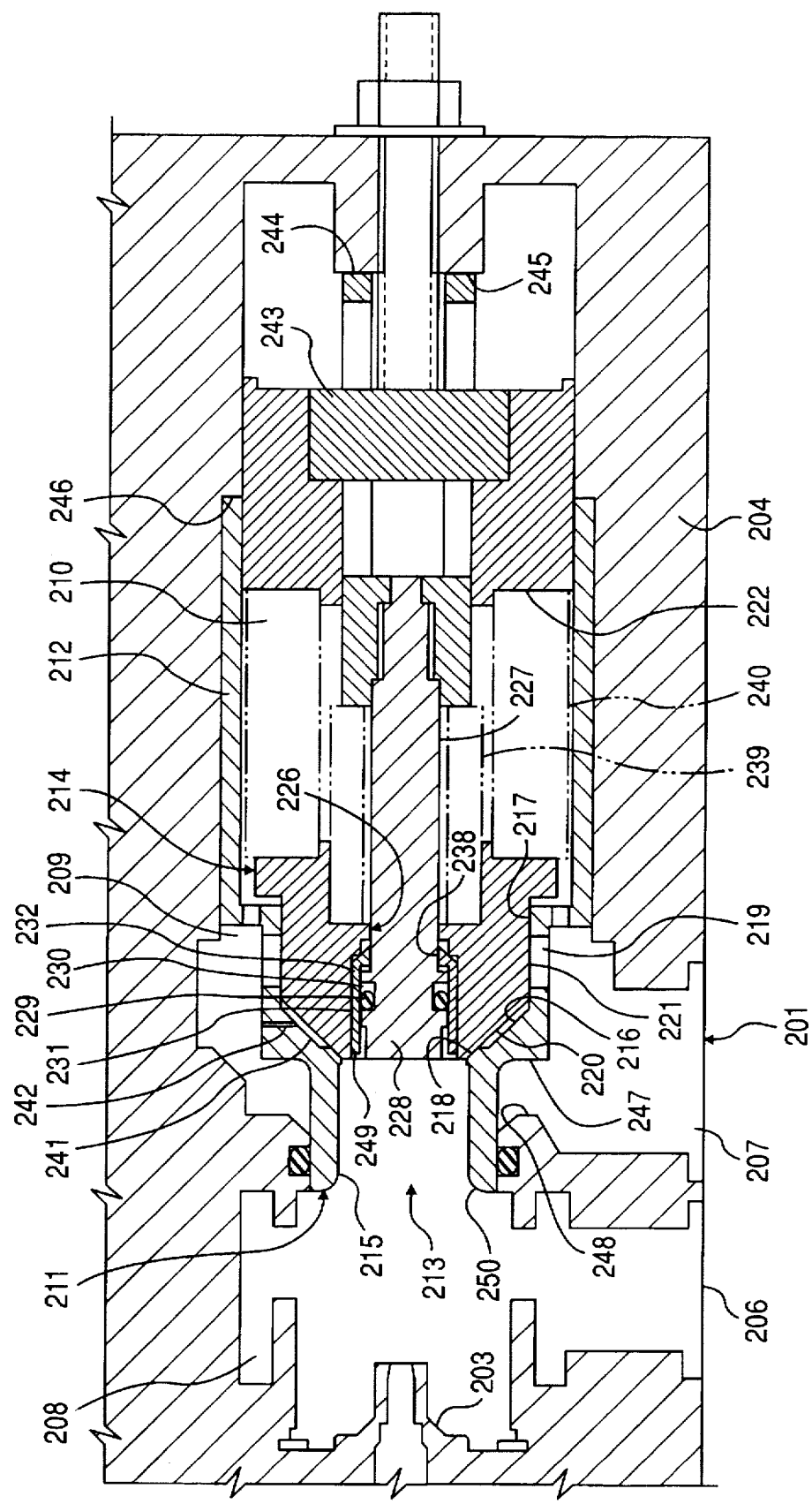
FIG. 2 is a cross section of an essential part of one embodiment of this invention in the preload condition.

For preparing for driving the press, the hydraulic pump 202 is started, and when internal pressure of the pressure chamber 208 exceeds the specified pressure, the main valve element 211 and the pilot valve element 214 are moved to the pressure setting chamber 210 side while resisting to the pressure setting spring 240 by internal pressure of the pressure chamber 208, and as shown in FIG. 2, the guide sleeve 212 is received with the valve case center end face 246 of the valve case 204, the move of the main valve element 211 to the pressure setting chamber 210 side is restricted, and in addition, the support end face 244 comes in contact with the valve case depth end face 245, and the pilot valve element 214 presses and closes the pilot valve surface 220 against the pilot valve seat 218 of the main valve element 211 with the energizing force of the support spring 239 and pressure setting spring 240.

And when internal pressure of the pressure chamber 208 reaches the preload pressure, the hydraulic pump 202 stops. In this event, the support spring 239 contributes to securing the minimum reference value of relief pressure (for example, 2 MPa), and screwing the adjusting screw 224 varies the spring force of the pressure setting spring 240, contributing to adjusting pressure setting in the relief pressure setting range (for example, 2–3.5 MPa) exceeding the minimum reference value.

Because by allowing the support end face 244 to come in contact with the valve case depth end face 245, influences of internal pressure of the pressure chamber 208 on the pressure bearing area of the end face formed on the pressure chamber 208 side by the head 228 of the support and the sub valve element 232 are eliminated, and the pilot valve element 214 bears internal pressure of the pressure chamber 208 with a small doughnut-ring-shape pressure bearing area between the sub valve seat 238 of the pilot valve element 214 and the pilot valve seat 218 of the main valve element 211, the energizing force to oppose this pressure can be reduced, and to oppose high relief pressure (for example, Max. 3.5 MPa), using the small support spring 239 and the pressure setting spring 240, the pilot valve face 220 of the pilot valve element 214 can be pressed against the pilot valve seat 218 of the main valve element 211 or energized to the relevant pilot valve seat 218 side, and a compact relief valve mechanism with low inertia and high response can be formed.

When internal pressure of the pressure chamber 208 reaches the preload pressure and if for example, a hydraulic jack is used for the slide to apply load for carrying out static setting of the required relief pressure after the hydraulic pump 202 stops, internal pressure of the pressure chamber 208 increases in proportion to the increase of the load, and internal pressure of the pressure chamber 208 is loaded to the doughnut ring shape pressure bearing area between the sub valve seat 238 of the pilot valve element 214 and the pilot valve seat 218 of the main valve element 211, and if the thrust by this oil pressure exceeds the set pressure of the support spring 239 and the pressure setting spring 240, as shown in FIG. 3, the pilot valve element 214 separates from the pilot valve seat 218, allowing the pressurized oil in the pressure chamber 208 to pass the small-diameter section 215, pilot valve seat 218, pilot chamber 241, orifice 242, and the valve chest 209, and flow out from the return port 207.

After the adjusting screw 224 is driven to advance or retreat the spring support seat 222 with the pressure setting chamber 210 so that the pressure of the pressurized oil chamber when relief oil comes out from this return port 207 becomes the overload relief pressure (for example, 3 MPa) and then, the energizing force of the support spring 239 and pressure setting spring 240 is adjusted, this adjusting screw 224 is fixed to the valve case 204 with the fixing screw 225.

In this case, because even when the sealing member 229 is pressed against the inner circumferential surface of the sub valve element 232 by pressure of the pressure chamber 208, pressure increase of the pressure chamber 208 is considerably slow as compared to that when overload occurs and the move of the pilot valve element 214 and the sealing member 229 become also slow, the sub valve element 232 moves to the pressure setting chamber 210 side together with the pilot valve element 214 while the sub valve element is being received with the sub valve seat 231 by the pressure of the pressure chamber 208, and there is no fear of leaking of pressurized oil from the pressure chamber 208 to the pressure setting chamber 210 through the clearance between the pilot valve element 214 and the sub valve element 232.

When dynamic pressure setting is carried out by using the relief valve 202 set for static pressure in this way, the sealing member 229 is pressed against the inner circumferential surface of the sub valve element by the pressure of the pressure chamber 208 and stops the sub valve elements 231 which suddenly tries to move to the pressure setting chamber 210 side as shown in FIG. 4 when overload occurs, but by the lubricating action of the pressurized oil pressure-fed from the pressure chamber 208 side to the fine clearance between the sub valve element 231 and the support inserting hole 222 of the pilot valve element 214, the pilot valve element 214 can move remarkably smoothly with respect to the sub valve element 231. As a result, the difference between the dynamic set pressure and the static set pressure becomes about ±2%, and at the same time the variation of dynamic set pressure also becomes within ±1%.

When overload occurs, the pilot valve element 214 opens or closes slightly, and as soon as it separates from the pilot valve seat 218, a large volume of compressed oil flows in the pilot chamber 241 and pressurized oil works on throughout the full length of the surface of the pilot valve face 220, and the opening pressure bearing area of the pilot valve element 214 suddenly and greatly changes instantaneously from the small doughnut ring shape between the sub valve seat 238 and the pilot valve seat 218 of the main valve element 211 to a large doughnut ring shape pressure bearing area between the sub valve seat 238 and the circumferential surface 221 of the main valve element 211, and large hydraulic thrust is generated to resist the support spring 239 and pressure setting spring 240, and the pilot valve element 214 instantaneously moves to the pressure setting chamber 210 side and at the same time pressurized oil works on throughout the full length of the whole surface of the taper section 216 with a large pressure bearing area which instantaneously generates large valve opening thrust on the pressure chamber 208 side, and the main valve element 211 generates large hydraulic valve opening thrust that moves rapidly to the pressure chamber 208 side to resist against the small valve closing thrust in the direction of the pressure setting chamber 210 side which internal pressure of the pressure chamber 208 generates and works on the pressure chamber 208 side end face 250 of the small pressure bearing area of the main valve element 211 when the pilot valve element 214 closes the pilot valve seat 218, and finally, the main valve element 211 rapidly opens fully.

As a result, the main valve element 211 and the pilot valve 214 oppose each other and rapidly open, and the main valve hole 219 instantaneously opens, and a large volume of pressurized oil passes this main valve hole 219 to escape to the valve chamber 209, instantaneously canceling the overload condition.

Because the clearance between the circumferential surface of the sub valve chest 231 of the pilot valve element 214 and the sub valve element 232 is small, even if the sub valve element 232 is separated from the sub valve seat 238 when overload occurs, by the restricting action of this clearance, leakage of pressurized oil from the pressure chamber 208 to the pressure setting chamber 210 through the clearance between the pilot valve element 214 and the sub valve element can be prevented.

In recent forging machinery such as presses, by setting the relief set pressure to a high value (for example, 2.5→3.5 MPa) and increasing the energy density by oil pressure, the slide cylinder diameter is reduced, thereby rapidly achieving compactness and price reduction of the machine. In addition, the slide stroke operation is increased (for example, 50→120 SPM) to achieve higher processing efficiency.

Consequently, elimination of sticking of the sealing member (for example, packing) and detrimental effects of sliding resistance in increasing set pressure of the relief valve to be loaded and improved response by achieving low inertia (for example, reduction of mass by achieving compactness) in increasing speed greatly improve the relief performance, stabilize pressurizing capacity of the forging machines, protect the forging machine proper and dies, and support high-performance processing.

As described above, the relief valve according to this invention expands the inner circumferential surface of the valve element to form a sub valve chest, arranges a sub valve element externally fitted to the support and sealing member in this sub valve chest, seals the clearance between the inner circumferential surface of this sub valve element and the support with the sealing member, and at the same time seals the clearance between the sub valve element and the support inserting hole by pressing the sub valve element against the diameter changing portion of the inner circumferential surface of the valve element with oil pressure exerted on the sub valve element from the pressure bearing surface side.

Consequently, for example, because the sealing member deformed by pressure exerted from the pressure bearing surface side at the time of overload interferes with the move of the sub valve element directly in contact, but does not interfere with the move of the valve element not directly in contact, and rather by the lubricating action of the pressurized oil pressure-fed between the circumferential surface of the support inserting hole and the sub valve element, the valve element is able to move smoothly, and in addition, by allowing the support end face to come in contact with the valve case depth end face, the pilot valve element receives the internal pressure of the pressure chamber with a small doughnut ring shape pressure bearing area between the sub valve seat of the pilot valve element, from which the influence of the internal pressure of the pressure chamber exerted on the pressure bearing area of he end face formed on the pressure chamber side by the support head and the sub valve element is eliminated, and the pilot valve seat of the main valve element, the energizing fore as the relief valve for resisting against this can be made small, and against high relief pressure (for example, Max. 3.5 MPa), with small support spring and pressure setting spring, the pilot valve surface of the lightweight pilot valve element can pressurize the pilot valve seat of the main valve element or can energize it to the pilot valve seat side, compactness and high-speed response with low inertia can be achieved, relief performance shown in FIG. 21 can be exhibited, and the difference between the static set pressure and the dynamic set pressure can be reduced to, for example, about ±2% and variation of dynamic set pressure can be reduced, for example, within ±1%, ensuring marked advantages in protecting presses and dies.

What is claimed is:

1. A relief valve comprising a valve chest and a primary passage which allows the valve chest to be in free communication with a pressurized oil passage outside the valve case formed in a valve case, a main valve element directly including a pilot valve element in the valve case arranged, a oil passage of the main valve hole formed with holes with different diameters comprising a small-diameter section, a taper section in which the diameter gradually increases, and a large-diameter section arranged in that order in such a manner that the diameters continuously change, a pilot valve seat sealably in contact with a pilot valve element formed at the connections between the small diameter section and the taper section, the tip end of the pilot valve element with tapered circumferential surface, the outer circumferential edge slidably fitted to the large-diameter cylinder section of the main valve element, a main valve hole formed on the circumferential wall of the large-diameter cylinder section of the main valve element, an opening pressure bearing area of the pilot valve rapidly increased, the pilot valve element is rapidly opened, and at the same time the valve opening pressure bearing area of the main valve element by separating the pilot valve element from the main valve element by exerting oil pressure of the primary passage to the pilot valve via an oil passage formed in the main valve element while resisting against the energizing means for energizing pilot valve element in the direction of the main valve element, thereby rapidly and fully opening the main valve element in the direction opposite to the pilot valve element, and allowing the pilot valve element to open and close the oil passage between the pilot valve seat and the main valve hole, a valve element externally fitted to the shaft shape support fixed to the valve case in such a manner free to advance and retreat in the axial direction, a sealing means comprising an elastic body for sealing the clearance between the support and the valve element, characterized by expanding the inner circumferential surface of the valve element to form a sub valve chest, arranging a sub valve element externally fitted to the support and sealing member in this sub valve chest, sealing the clearance between the inner circumferential surface of the sub valve element and the support with the sealing member, and at the same time pressing the sub valve element against the diameter changing section of the inner circumferential surface of the valve element by oil pressure exerted from the pressure bearing area to the sub valve element to seal the clearance between the sub valve element and the support inserting hole.

* * * * *